United States Patent [19]

Biber

[11] Patent Number: 4,551,825

[45] Date of Patent: Nov. 5, 1985

[54] SONIC RANGING/DETECTION SYSTEM EMPLOYING VARIED BEAMWIDTH

[75] Inventor: Conrad H. Biber, Needham, Mass.

[73] Assignee: Polaroid Corporation, Cambridge, Mass.

[21] Appl. No.: 438,052

[22] Filed: Nov. 1, 1982

[51] Int. Cl.[4] .......................... G01S 15/14; G01S 7/52
[52] U.S. Cl. ..................................... 367/101; 367/103; 367/116
[58] Field of Search .................. 367/101, 102, 87, 99, 367/116, 103; 343/5 PD

[56] References Cited

U.S. PATENT DOCUMENTS

| | | | |
|---|---|---|---|
| 3,321,737 | 5/1967 | Russell | 367/116 |
| 3,366,922 | 1/1968 | Kay | 367/102 |
| 3,757,285 | 9/1973 | Ferré | 367/108 |
| 3,943,482 | 3/1976 | Murphree et al. | 367/101 |
| 4,199,246 | 4/1980 | Muggli | 367/101 |
| 4,280,204 | 7/1981 | Elchinger | 367/116 |

OTHER PUBLICATIONS

Kuhl et al., Acoustica, vol. 4, No. 5, 1954, pp. 519–532.

*Primary Examiner*—Richard A. Farley
*Attorney, Agent, or Firm*—John J. Kelleher

[57] ABSTRACT

A sonic ranging and/or object detection system, particularly useful for the blind, periodically employs widely different pulse frequencies in order to distinguish between objects located directly in front of the energy transmitting portion of this system and those located to either side. The higher frequency pulses produce a relatively narrow sonic energy beam width for detecting centrally located objects and the lower frequency pulses produce a relatively broad sonic energy beam width for detecting lateral or off-center objects. One or more time-related audible tones are superimposed on each of the pulse frequencies for range determining and/or object distinguishing purposes.

3 Claims, 2 Drawing Figures

SONIC RANGING/DETECTION SYSTEM EMPLOYING VARIED BEAMWIDTH

BACKGROUND OF THE INVENTION

The invention relates to sonic ranging and/or object detection systems, in general, and to such systems for aiding visually impaired persons, in particular.

Ultrasonic rangefinders for detecting the presence of or the distance to an object are well-known in the prior art. In, for example, U.S. Pat. No. 4,199,246 to MUGGLI, an ultrasonic rangefinder having a combination transmitting and receiving, capacitance-type, electrostatic transducer is incorporated in a photographic camera for the purpose of determining the distance to a subject and subsequently causing the adjustable focus lens of such a camera to be focused in accordance with a subject distance signal derived by said rangefinder.

In U.S. Pat. No. 4,280,204 to ELCHINGER, the disclosure of which is specifically incorporated herein, a conventional mobility cane for the blind incorporates ultrasonic object sensing apparatus in order to provide a blind, ambulatory cane user with the capability of remotely sensing the presence of movement-impeding obstacles within a spacial zone produced by said apparatus, whose size is infinitely variable. This sensing apparatus includes an adjustably mounted combination transmitting and receiving capacitance-type electrostatic transducer having an energy transmission pattern that approximates the size of said spacial zone.

The ultrasonic transducers described in the two above-mentioned patents transmit a directional, multiple-lobe pattern of ultrasonic energy whose contours are fairly well understood in the art. The multiple-lobe transducer pattern of a transducer with a circular backplate of 3.5 cm in diameter, for example, consists of a central lobe having a lobe angle of approximately 12° at its half power point (−3dB) when operated at a frequency of 50 KHz, with said central lobe being generally symmetrical about a central axis and with a plurality of smaller magnitude side lobes that are also generally symmetrical about said central lobe axis. This electrostatic transducer, multiple-lobe pattern is described in much greater detail in an article by W. KUHL, et al., entitled "Condenser Transmitters and Microphones with Solid Dielectric Airborn Ultrasonics" in Acoustica, volume 4, 1954, pp. 519-532.

Lobe pattern shape of an electrostatic transducer of the type mentioned above is primarily a function of transducer operating frequency and transducer backplate diameter. The higher the operating frequency, the narrower is the central lobe angle and the lower the operating frequency, the wider is the central lobe angle. The central lobe angle of the object sensing apparatus disclosed in the above-mentioned ELCHINGER patent was purposely narrowed in order to provide a visually impaired person with a cue as to the direction of a particular detected object.

A disadvantage associated with sonic sensing apparatus of the type described, for example, in said above-mentioned ELCHINGER patent is the need to regularly move such sensing apparatus from side-to-side in order to provide a mobility cane user with directional information with respect to laterally positioned objects. Constant movement of a cane of this type can become tiring to a cane user as well as inconvenient to manipulate. Failure to so manipulate such a cane can result in the failure to detect a laterally positioned object and subsequent injury to a blind mobility cane user walking into such an object.

A primary object of the present invention is to provide apparatus for detecting the presence of frontally and laterally positioned objects that does not require the physical movement of said apparatus.

Another object of the present invention is to provide apparatus that can both determine the relative distance to frontally located objects and also detect the presence of laterally located objects.

A further object of the present invention is to provide a mobility cane for the blind that will enable a blind user to determine the presence of and relative distance to frontally located objects as well as determine the presence of laterally located objects.

Other objects, features and advantages of the present invention will be readily apparent from the following detailed description of the preferred embodiment thereof, taken in conjunction with the accompanying drawings.

SUMMARY OF THE INVENTION

In accordance with the teachings of the present invention, a sonic ranging and/or object detection system is provided that is capable of both detecting object presence and of distinguishing between objects located in front and those located to either side of the sonic energy transmitting portion of said system without requiring the physical movement of said system to obtain such information. The system includes a capacitance-type, electrostatic transducer having a frequency dependent sonic energy transmission pattern. Means are provided for periodically changing the sonic energy transmission frequency to thereby periodically change the beam width or contours of said transmission pattern for object direction distinguishing purposes. Means are also provided for generating variable and fixed pitch audible signals with the generation and pitch of the variable pitch signal being object distance dependent and with the generation of the fixed pitch signal being dependent upon object presence only.

DESCRIPTION OF THE PREFERRED EMBODIMENTS

Figure 1:
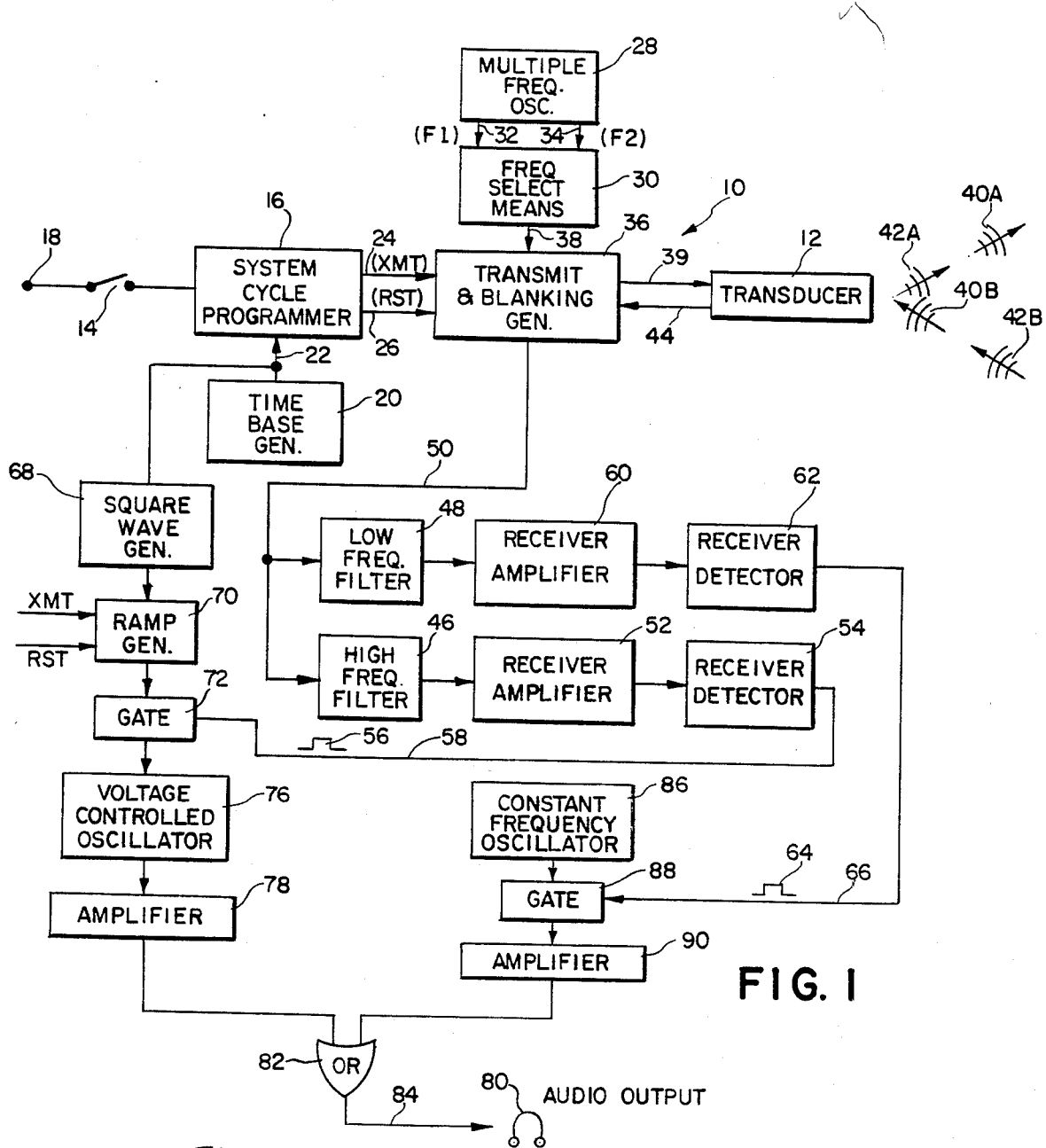
FIG. 1 is a signal flow block diagram of the sonic object ranging and/or detection apparatus of the present invention.

Referring now to the drawings, and specifically, to FIG. 1, a signal flow block diagram of sonic ranging and/or object detection apparatus 10 incorporating a preferred embodiment of the present invention, is depicted. Ranging and/or detection apparatus 10 includes combination transmitting and receiving, capacitance-type electrostatic transducer 12. Transducer 12 transmits and receives a directional, frequency-dependent multiple-lobe pattern of ultrasonic energy, the envelope or contours of which, as noted above, are fairly well understood in the art. By periodically changing the transmission frequency of the ultrasonic energy transmitted by transducer 12, the energy transmission pattern of said transducer 12 is periodically altered which, when combined with a combination of fixed and variable pitch signals, enables a visually impaired user of apparatus 10 to distinguish between objects located in front and those located to either side of said transducer 12 as well as the relative distance to said frontally located object. The operation of apparatus 10 as well as the interaction and/or cooperation between components of sonic ranging and/or object detection apparatus 10 will now be described in detail.

In order to cause transducer 12 to transmit bursts of ultrasonic energy toward frontally and laterally positioned objects at periodically changing frequencies for the purpose of detecting the presence of or relative distance to objects so positioned, power switch 14 is manually closed in order to cause electrical power to be applied to system cycle programmer 16 and to other electrical components of apparatus 10 from a suitable source of electrical power (not shown) that is connected to electrical terminal 18. When power is applied to programmer 16 and to other ranging and/or detection system components, said programmer 16 divides-down the high frequency output pulses from crystal oscillator or time base generator 20 that are routed to said programmer 16 through path 22, into a transmit and reset pulse train having the same pulse repetition frequency but shifted in phase from one another. Transmit pulses produced at programmer output 24 are designated XMT pulses. Reset pulses produced at programmer output 26 and designated RST pulses, are the same as the XMT pulses in height and width, but are delayed with respect to said XMT pulses by about 200 ms which is greater than the round trip time needed for sonic energy to travel from transducer 12 to a remote object and return, under normal conditions of temperature and pressure, for an object located at a distance of approximately 50 ft. from transducer 12. This arrangement will allow any echo from an object within 50 ft. of said transducer 12 to be received in a time interval between successive RST pulses or before a subsequent XMT pulse. The frequency of the sonic energy transmitted by transducer 12 is primarily determined by the combination of multiple frequency oscillator 28 and frequency selecting means 30. Multiple frequency oscillator 28 generates two widely different, predetermined, fixed frequencies $F_1$ and $F_2$ at its outputs 32 and 34, respectively, and at the input to frequency selecting means 30. In this, the preferred embodiment, frequency $F_1$ is 60 KHz and frequency $F_2$ is 40 KHz. In addition, frequency selecting means 30 selects frequencies $F_1$ and $F_2$ and alternately applies said frequencies to an input of transmit and blanking generator 36 through path 38.

Transmit and blanking generator 36, to which XMT and RST pulses as well as oscillator frequencies $F_1$ and $F_2$ are applied, operate in a manner similar to the corresponding components in the ultrasonic ranging system described in said above-cited MUGGLI patent, which is to cause transducer 12 to transmit periodic bursts or pulses of ultrasonic energy at frequencies selected by select means 30 in response to a signal produced by said generator 36 on path 39. Two of said energy pulses are illustrated at 40A and 42A and echoes of said transmitted energy pulses are illustrated at 40B and 42B, respectively. In addition to its transmit function, transmit and blanking generator 36 alternately blocks or blanks and unblanks receive signals produced by transducer 12, signals that would appear on path 44 if an object or objects should be detected. In other words, during the blanking interval, echo signals produced by transducer 12 are prevented from moving much beyond said path 44. The duration of the unblanked interval of time corresponds to the depth of a spacial zone within which an object distance or presence is sought to be detected and the blanked intervals of time correspond to spaces immediately adjacent said spacial zone.

During the interval of time when echo signals produced by transducer 12 are not blanked by transmit and blanking generator 36, said echo signals are routed to the input of high pass frequency filter 46 and to the input of low pass frequency filter 48 through path 50. An echo signal resulting from a burst of ultrasonic energy at frequency $F_1$ will be blocked by low pass filter 48, but will flow or pass through high pass filter 46 to the input of receiver amplifier 52. The output of receiver amplifier 52 is detected by receiver detector 54, causing echo pulse 56 to be produced at its output and on path 58. Similarly, an echo signal resulting from a burst of ultrasonic energy at lower frequency $F_2$ will be blocked by high pass filter 46, but will flow or pass through low pass filter 48 to the input of receiver amplifier 60. The output of receiver amplifier 60 is detected by receiver detector 62, causing echo pulse 64 to be produced at its output and on path 66. The time between a transmit pulse XMT and either echo pulse 56 or echo pulse 64 is proportional to the distance between an object in a spacial zone where objects can be detected and said ranging/detecting apparatus 10. This particular relationship is a major factor in establishing the depth of a spacial zone within which objects are sought to be detected or to which the distance is sought to be determined.

While a burst of ultrasonic energy is being generated by transducer 12 in response to a signal from transmit and blanking generator 36, the input to receiver amplifiers 52 and 56 through their associated filters are clamped at a fixed potential (normally ground) to prevent the simultaneous generation of false object detect signals by receiver detectors 54 or 62 because of their input being coupled to transducer 12 through receiver amplifier 52 and 60 and said transmit and blanking generator 36. This clamp is periodically removed so that an echo signal of ultrasonic energy that was transmitted while said clamp was applied can subsequently be detected. This clamp is alternately applied and removed at the appropriate time during each ultrasonic energy transmit and receive cycle established by system cycle programmer 16 in conjunction with crystal oscillator or time base generator 20. If an object is detected within a time interval corresponding to the depth of a spacial zone within which the presence of or distance to an object is sought to be detected, an echo signal produced by transducer 12 is routed to either receiver detector 54 or receiver detector 62, which, as explained above, is dependent upon the frequency of the echo signal produced by transducer 12, and either echo pulse 56 or echo pulse 54 will be produced at the output of receiver detector 54 or receiver detector 62, respectively.

In addition to system cycle programmer 16, the output from time base generator 20 is also applied to the input to square wave generator 68. Square wave generator 68, in turn, produces a continuous train of periodic voltage pulses, of predetermined size, having the same frequency as the output of time base generator 20. The output of square wave generator 68 as well as XMT and RST pulses from programmer 16 are applied to ramp generator 70. Ramp generator 70 integrates the square wave voltage pulses from square wave generator 68 and produces a constant slope or ramp voltage at its output that is the integral of the square wave pulses at the square wave generator output over a specific interval of time. The voltage ramp is initiated when an XMT pulse is applied to ramp generator 70 and said ramp voltage is reduced to zero when an RST pulse is subsequently applied to said ramp generator 70.

The output of ramp generator 70 is applied to the input of gate 72 which is a normally opened (non conducting) device. When echo pulse 56 is generated by detector 62 and applied to gate 72 through path 58, said gate 72 will conduct for a length of time that closely approximates the pulse width of said echo pulse 56. The magnitude of the output voltages of gate 72 when in its conductive state is proportional to the distance to the object from which an echo of a burst of ultrasonic energy at frequency $F_1$ was reflected. An echo received by transducer 12 from a close object in a short period of time would result in a lower voltage being present at the output of gate 72 than there would be from an echo received by said transducer from a more remote object in a relatively longer period of time.

The gated ramp output voltage of gate 72 is applied to a hold capacitor (not shown) within hold circuit 74 where it is held at a constant value until an RST pulse is applied to said hold circuit 74 at the end of an ultrasonic energy transmit/receive cycle. When an RST pulse is so applied to hold circuit 74, the voltage on the hold capacitor in hold circuit 74 is reduced to zero. The voltage on the hold capacitor within hold circuit 74 is applied to voltage controlled sine wave oscillator 76. The output of said oscillator 76 is amplified by amplifier 78 and is then applied to a set of audio-type earphones 80 through OR gate 82 and path 84. The output frequency of voltage controlled oscillator 76 is inversely proportional to the input voltage to said oscillator 76. When the output of oscillator 76 is applied to earphones 80 as previously described, an audible signal whose pitch is inversely proportional to the distance to objects located in front of transducer 12 will be heard at said earphones 80.

In addition to object distance related signals indicating the presence of frontally located objects being applied to earphones 80, a second audible signal indicating the presence of objects to either side of said frontally located objects is also applied to said earphones 80. The signal for detecting said laterally positioned objects is produced in the following manner. The output of constant frequency oscillator 86 is applied to the input of gate 88 which is a normally open (non conducting) device. When echo pulse 64 is generated by detector 62 and applied to gate 88 through path 66, said gate 88 will conduct for a length of time that closely approximates the pulse width time of said echo pulse 64. When gate 88 is momentarily closed or turned on by echo pulse 64, the output of oscillator 86 is first amplified by amplifier 90 and then momentarily applied to earphones 80 through OR gate 82. When said oscillator output is so applied, an audible signal, having a fixed pitch, indicative of the presence of a laterally positioned object, will be heard at earphones 80.

Figure 2:
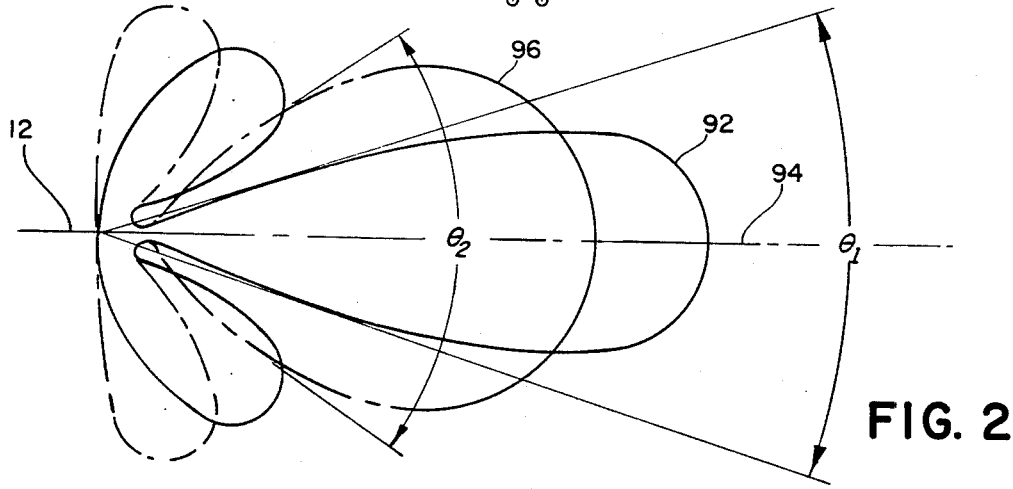
FIG. 2 is an approximation of the beam or lobe pattern of the capacitance-type transducer of FIG. 1 for two different sonic energy transmission frequencies, showing acoustical energy transmission as a function of the angle of the principal or main lobe axis of said transducer.

As explained above, the bursts of ultrasonic energy producing the distance and object presence related audio signals at earphones 80 was transmitted by capacitance-type transducer 12 at two different frequencies $F_1$ and $F_2$. This energy was transmitted in multiple lobe patterns similar to that shown in drawing FIG. 2. In drawing FIG. 2, a multiple lobe pattern of ultrasonic energy that includes main lobe 92 and several smaller side lobes (only two being illustrated) is shown being transmitted by transducer 12 in a symmetrical manner at frequency $F_1$ about main lobe axis 94. In addition, a second multiple lobe pattern of ultrasonic energy that includes main lobe 96 and several smaller side lobes (only two being illustrated) is also shown being transmitted by said transducer 12 in a symmetrical manner, at frequency $F_2$, about said main lobe axis 94. Main lobe 92 is defined by its lobe angle $\theta_1$ which, as explained above, is a function of frequency $F_1$ and, main lobe 96 is defined by its lobe angle $\theta_2$ which is a function of transducer 12 transmission frequency $F_2$.

DISCUSSION

Frequency $F_1$ (60 KHz) is higher than frequency $F_2$ (40 KHz) which results in a main lobe angle $\theta_1$ that is smaller than frequency $F_2$ related main lobe angle $\theta_2$. The wider the lobe angle, the more laterally transmitted will be the object detecting ultrasonic energy. The ultrasonic energy transmission frequency is primarily determined by frequency selecting means 30 and multiple frequency oscillator 28. In this, the preferred embodiment, frequencies $F_1$ and $F_2$ are alternately selected by means 30. However, another though less desirable energy transmission method might be the transmission of two or more bursts of ultrasonic energy at frequency $F_1$ followed by a single burst of ultrasonic energy at frequency $F_2$ so that more time would be spent searching for frontally located objects than would be spent searching for laterally located objects. Many other combinations of periodic bursts of ultrasonic energy may also be employed to change the ratio of frontal to lateral object detection time to meet the needs of a particular set of ranging and object detection conditions.

When apparatus 10 is incorporated in a mobility cane for the blind, which is the primary environment for such apparatus 10, it makes it unnecessary for the cane user to constantly rotate the cane about its longitudinal axis in order to detect laterally positioned objects, a manipulation that is necessary when using a mobility cane employing object detection apparatus such as that described in the above-cited patent to ELCHINGER.

As explained above, two different audible signals are used in conjunction with the ultrasonic object detection system in apparatus 10 so that a blind user of said apparatus can readily distinguish between frontally and laterally positioned objects. One signal is a variable pitch one that indicates relative distance to frontally located objects, whereas the other is a fixed pitch signal that indicates presence only of laterally located objects. In order to avoid confusing a blind cane user when attempting to distinguish between frontally and laterally located objects, it is essential that the constant pitch audible signal be chosen such that it is well outside the range of the variable pitch audible signal in order to avoid a situation where two tones having more or less the same pitch are indicating the presence of objects located in two different locations with different audible signals that sound the same.

It will be apparent to those skilled in the art from the foregoing description of my invention that various improvements and modifications can be made in it without departing from its true scope. The embodiments described herein are merely illustrative and should not be viewed as the only embodiments that might encompass my invention.

What is claimed is:

1. Object detection apparatus comprising means for transmitting a urst of sonic energy at more than one frequency toward a remote object and detecting a reflection of said energy from said object, said tramsmitting means including an electrostatic transducer having a frequency dependent transmission pattern, and means for alternately changing the sonic energy transmission frequency between relatively high and low frequencies wherein a portion of said transmission pattern includes a central beam portion defined by a beam angle and said beam portion is alternated between relatively narrow and wide beam angles in response to said alternating sonic energy transmission frequencies;

means responsive to the transmission and reception of said narrow central beam angle burst of sonic energy in a particular direction and at a first frequency toward a remote object for generating a signal respresentative of object distance;

means responsive to said object distance signal for generating an audible signal whose pitch is varied in accordance with the distance to said remote object;

means responsive to the transmission and reception of said wide central beam angle burst of sonic energy at a second frequency in said particular direction for generating a signal respresentative of the presence of an object located in a direction at an angle to said particluar direction; and means responsive to said object presence signal for generating an audible signal, of constant pitch, indicating the presence of an object in said angled direction.

2. Object detection apparatus comprising means for transmitting energy toward one or more objects in the direction of travel and for detecting a reflection from such objects, said transmitting means including a transducer energizeable for producing a forwardly directed transmission pattern having at least a central beam portion whose beamwidth varies in accordance with the frequency of energization, and actuatable means for sequenctially energizing said transducer, with at least a first and a second frequency to vary the beamwidth accordingly and thereby detects objects centrally located before said transducer responsive to one of said energizations and more laterally located objects responsive to another of said energizations; and means responsive to detection of a reflection in response to said one energization for producing a signal varying with range of the object so detected and in response to detection of a reflection in response to said other energization for producing a constant signal indicative of mere detection of an object.

3. Apparatus for detecting and distinguishing between forwardly positioned objects and other slightly laterally thereof, said apparatus comprising:

means for transmitting periodic bursts of energy in the direction of travel;

means for varying the frequency of said bursts to periodically provide at least a narrow and a wide beam pattern of said burst; and means for detecting echoes from narrow and wide beam patterns and for producing a first signal due to an echo from said narrow beam bursts and a second signal different from said first signal responsive to an echo from said wide beam bursts.

* * * * *